(12) United States Patent
Unlu et al.

(10) Patent No.: US 12,085,691 B2
(45) Date of Patent: Sep. 10, 2024

(54) METHOD AND DEVICE FOR HIGH-QUALITY IMAGING OF EMBEDDED TISSUE SECTIONS

(71) Applicant: Trustees of Boston University, Boston, MA (US)

(72) Inventors: M. Selim Unlu, Newton, MA (US); Nese Lortlar Unlu, Newton, MA (US); Celalettin Yurdakul, Santa Clara, CA (US); Iris Celebi, Allston, MA (US)

(73) Assignee: Trustees of Boston University, Boston, MA (US)

( * ) Notice: Subject to any disclaimer, the term of this patent is extended or adjusted under 35 U.S.C. 154(b) by 0 days.

(21) Appl. No.: 18/117,763

(22) Filed: Mar. 6, 2023

(65) Prior Publication Data
US 2023/0280501 A1    Sep. 7, 2023

Related U.S. Application Data

(60) Provisional application No. 63/397,218, filed on Aug. 11, 2022, provisional application No. 63/317,294, filed on Mar. 7, 2022.

(51) Int. Cl.
*G02B 1/113*    (2015.01)
*G01N 1/30*    (2006.01)
*G02B 21/06*    (2006.01)

(52) U.S. Cl.
CPC ............. *G02B 1/113* (2013.01); *G01N 1/30* (2013.01); *G02B 21/06* (2013.01)

(58) Field of Classification Search
USPC ................ 359/385, 391; 356/36, 237.1, 356/239.1–239.2, 237.2, 244
See application file for complete search history.

(56) References Cited

U.S. PATENT DOCUMENTS 4,545,831 A * 10/1985 Ornstein ............... G01N 1/28
    435/40.52
2006/0008790 A1    1/2006 Hayworth et al.
(Continued)

FOREIGN PATENT DOCUMENTS

JP    2006047572 A  *  2/2006

OTHER PUBLICATIONS

International Search Report and Written Opinion of International Application No. PCT/US2023/014634 mailed on May 26, 2023.
(Continued)

*Primary Examiner* — Derek S. Chapel
(74) *Attorney, Agent, or Firm* — Cesari and McKenna, LLP; Steven M. Mills

(57) ABSTRACT

A method and device for visualizing a sample having a tissue section embedded in a solid material are provided. The method and device include applying an incident light to the tissue section embedded in the solid material. The tissue section embedded in the solid material is disposed on a layered structure configured to reduce optical back reflection at an interface between the tissue section embedded in the solid material and the layered structure. The incident light passes through the tissue section embedded in the solid material and the layered structure with reduced reflection at each of the interfaces such that visualizing one or more artifacts from reflecting the incident light from surfaces of the tissue section embedded in the solid material is reduced.

30 Claims, 5 Drawing Sheets

(56) References Cited

U.S. PATENT DOCUMENTS

| | | | |
|---|---|---|---|
| 2011/0189722 A1 | 8/2011 | Barker et al. | |
| 2014/0270457 A1* | 9/2014 | Bhargava | G06V 20/69 |
| | | | 382/133 |
| 2016/0299328 A1* | 10/2016 | Ausserre | G02B 5/003 |
| 2017/0358082 A1 | 12/2017 | Bhargava | |
| 2019/0003956 A1* | 1/2019 | Campidelli | G01N 33/54373 |
| 2019/0339268 A1* | 11/2019 | Sevenler | G01N 33/569 |
| 2020/0158641 A1 | 5/2020 | Fan et al. | |
| 2020/0192072 A1 | 6/2020 | Husher et al. | |
| 2021/0050094 A1* | 2/2021 | Orringer | G01N 21/65 |

OTHER PUBLICATIONS

Bechara et al., "Histomorphologic correlation with routine histology and optical coherence tomography," Skin Research and Technology, vol. 10, pp. 169-173, 2004.

Cahill et al., "Rapid virtual hematoxylin and eosin histology of breast tissue specimens using a compact fluorescence nonlinear microscope," Lab Investigation, vol. 98, pp. 150-160, 2018.

Chen et al., "In Vivo Virtual Biopsy of Human Skin by Using Noninvasive Higher Harmonic Generation Microscopy," IEEE Journal of Selected Topics in Quantum Electronics, vol. 16, No. 3, pp. 478-492, 2010.

Fereidouni et al., "Microscopy with ultraviolet surface excitation for rapid slide-free histology," Nature Biomedical Engineering, vol. 1, pp. 957-966, 2017.

Freudiger et al., "Label-Free Biomedical Imaging withHigh Sensitivity by Stimulated Raman Scattering Microscopy," Science, vol. 322, pp. 1857-1861, 2008.

Fu et al., "Optimization of a Widefield Structured Illumination Microscope for Non-Destructive Assessment and Quantification of Nuclear Features in Tumor Margins of a Primary Mouse Model of Sarcoma," PLOS One, vol. 8, Iss. 7, pp. 1-14, 2013.

Gambichler et al., "Comparison of histometric data obtained by optical coherence tomography and routine histology," Journal of Biomedical Optics, vol. 10, No. 4, pp. 1-6, 2005.

Glaser et al., "Light-sheet microscopy for slide-free nondestructive pathology of large clinical specimens," Nature Biomedical Engineering, vol. 1, Art. 0084, pp. 1-10, 2017.

Hariri et al., "Diagnosing Lung Carcinomas with Optical Coherence Tomography" AnnalsATS, vol. 12, No. 2, pp. 193-201, 2015.

Ji et al., "Rapid, Label-Free Detection of Brain Tumors with Stimulated Raman Scattering Microscopy," Science Translational Medicine, vol. 5, Iss. 201, pp. 1-10, 2013.

Maier et al., "Morphology of basal cell carcinoma in high definition optical coherence tomography: en-face and slice imaging mode, and comparison with histology," JEADV, vol. 27, pp. e97-e104, 2013.

Orringer et al., "Rapid intraoperative histology of unprocessed surgical specimens via fibre-laser-based stimulated Raman scattering microscopy," Nature Biomedical Engineering, vol. 1, Art. 0027, pp. 1-13, 2017.

Sarri et al., "Stimulated Raman histology: one to onecomparison with standard hematoxylin and eosin staining," Biomedical Optics Express, vol. 10, No. 10, pp. 5378-5384, 2019.

Schlichenmeyer et al., "Video-rate structured illumination microscopy for high-throughput imaging of large tissue areas," Biomedical Optics Express, vol. 5, No. 2, pp. 366-377, 2014.

Tao et al., "Assessment of breast pathologies using nonlinear microscopy," PNAS, vol. 111, No. 43, pp. 15304-15309, 2014.

Tu et al., "Stain-free histopathology by programmable supercontinuum pulses," Nature Photonics, vol. 10, pp. 534-541, 2016.

* cited by examiner

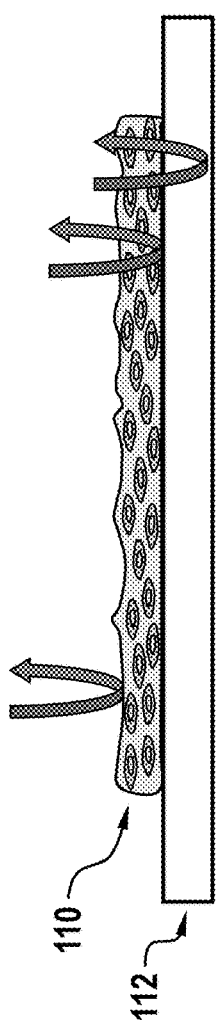
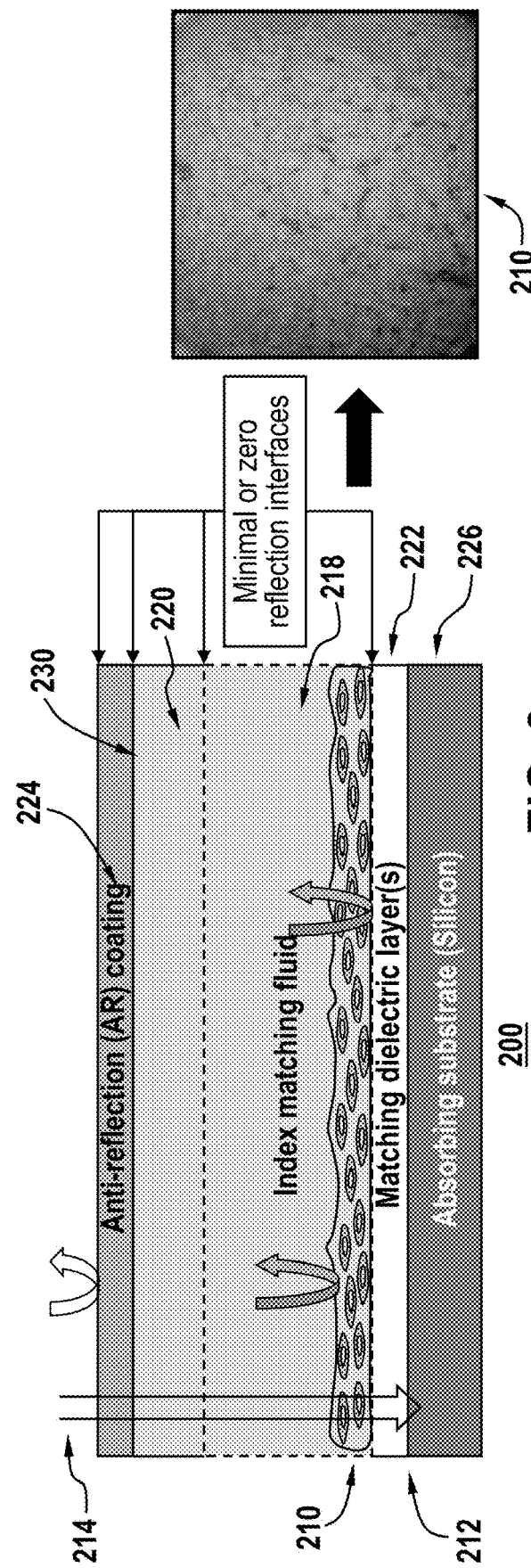

METHOD AND DEVICE FOR HIGH-QUALITY IMAGING OF EMBEDDED TISSUE SECTIONS

CROSS-REFERENCE TO RELATED APPLICATIONS

The present application is related to and claims the benefit of U.S. Provisional Application No. 63/317,294, filed on Mar. 7, 2022, and U.S. Provisional Application No. 63/397,218, filed on Aug. 11, 2022, the entire contents of which are incorporated herein by reference.

BACKGROUND

1. Technical Field

The present invention is related to high-quality imaging of embedded tissue sections, and, in particular, imaging of paraffin-embedded histopathology slides without removal of paraffin.

2. Discussion of Related Art

Microtomy and paraffin section preparation are crucial in obtaining high-quality sections to enable proper diagnostics. Typical preparation of Histopathology sections for histopathology requires skill and experience. Fixation is the most important step, and essential morphologic detail will be preserved only if the tissue is promptly and adequately fixed.

A paraffin block is the common element of all high-quality sections. Embedding tissue into paraffin blocks supports the tissue structure and enables very thin sections to be cut and mounted onto microscope slides for analysis. However, cutting sections by a microtome is a delicate process. There are many parameters that need to be carefully adjusted to obtain high-quality sections. For example, blade clearance angle is adjustable and must be set for optimum performance.

However, there are many common faults with traditional preparation of Histopathology sections. For example: an operator can provide the wrong micrometer setting; section at too great a speed; trim a block too quickly; not polish a block by cutting some thin sections after roughing; utilize inappropriate section thickness when trimming; cut a block which is brittle or too cold when trimmed; permit debris in unfiltered wax; not contemplate buffer salts precipitated in specimens; conduct vigorous treatment to dislodge wrinkles during flotation; or introduce non-optimal clearance angle setting. In light of these considerations, the process for deparaffinization and staining is laborious and complex, adding cost and time. Further complicating this issue is that many of these faults are only observed after the section is fully processed/stained and imaged.

Paraffin embedded sections are not amenable to high-quality optical imaging and inspection by conventional methods, as sections have optically rough surfaces, and tissue sections are composed of low-contrast features. Additionally, there is concern regarding background light from surface reflections when light is applied to a structure. For these reasons, direct microscopy of paraffin embedded tissue sections by conventional methods does not meet the need.

SUMMARY

According to one aspect of the invention, a method for visualizing a sample is provided. The method includes providing a tissue section embedded in a solid material and applying an incident light to the tissue section embedded in the solid material. The tissue section embedded in the solid material is disposed on a layered structure configured to reduce optical back reflection at an interface between the tissue section embedded in the solid material and the layered structure. The incident light passes the tissue section embedded in the solid material and the layered structure with reduced reflection at each of the interfaces such that one or more artifacts from reflecting the incident light from surfaces of the tissue section embedded in the solid material is reduced.

In some exemplary embodiments, a surface of the top window is coated with an anti-reflective coating. According to another aspect of the present disclosure, the anti-reflective coating reflects a minimal amount of light.

In some exemplary embodiments, the solid-embedded tissue section comprises paraffin. In other exemplary embodiments, the tissue section embedded in the solid material comprises a dielectric material.

In some exemplary embodiments, the tissue section embedded in the solid material is optimized to reduce optical reflection at a selected illumination wavelength for a paraffin layer without any tissue embedded.

According to another aspect, the layered structure is strongly absorbing. In some exemplary embodiments, the layered structure is comprised of silicon.

In some exemplary embodiments, the layered structure is comprised of silicon-nitride. According to another aspect, the silicon-nitride coating provides less than 1% reflectivity at a selected illumination wavelength. According to another aspect, the selected illumination wavelength enables observation of one or more features of the tissue section embedded in the solid material and a surface reflection separately.

In some exemplary embodiments, the reduction of the reflection from a bottom surface of the layered structure is achieved by index matching paraffin and index matching medium. According to another aspect, the reduction of the reflection from a top surface of the layered structure is achieved by index matching paraffin and index matching medium.

In some exemplary embodiments, the layered structure reflects differently at different wavelengths to provide multi-color imaging. According to another aspect, the multi-color imaging provides an additional background rejection mechanism. According to another aspect, the multi-color imaging provides identification of artifacts in the tissue section embedded in the solid material. According to another aspect, the multi-color imaging provides inputs for machine learning and artificial intelligence methods for artificial staining of the image of the tissue section embedded in the solid material.

In some exemplary embodiments, visualizing one or more artifacts includes two or more consecutive tissue sections imaged for three-dimensional reconstruction.

In some exemplary embodiments, evaluating the sample is performed to determine whether the tissue section embedded in the solid material should be removed from the sample for further processing. According to another aspect, evaluating the sample is performed to determine whether the sample should be stained.

According to another aspect, the layered structure can reflect differently at different illumination angles to provide multi-modal imaging by varying the illumination angle. In some exemplary embodiments, multi-modal imaging is achieved by apodizing the illumination beam. In some exemplary embodiments, multi-modal imaging achieved by varying the illumination angle provides an additional background rejection mechanism. In some exemplary embodiments, multi-modal imaging achieved by varying the illumination angle provides identification of components in the tissue section embedded in the solid material. In some exemplary embodiments, multi-modal imaging by varying the illumination angle provides for machine learning and artificial intelligence methods for artificial staining the image of the tissue section embedded in the solid material.

According to another aspect, a device for visualizing a sample is provided. The device includes a layered structure beneath a tissue section embedded in a solid material. The layered structure is configured to reduce optical back reflections at an interface between the tissue section embedded in the solid material and the layered structure when an incident light is applied to the tissue section embedded in the solid material. The incident light passes through the tissue section embedded in the solid material, and the layered structure with reduced reflection at each of the interfaces such one or more artifacts from reflecting the incident light from surfaces of the tissue section embedded in the solid material is reduced.

According to another aspect, a method for visualizing a sample is provided. The method includes providing a tissue section embedded in a solid material having a first surface and a second surface mounted on a transparent substrate. Also, the method includes positioning a layered structure on the first surface of the tissue section embedded in the solid material. The layered structure is configured to have reduced reflection at the first surface of the tissue section embedded in the solid material. Furthermore, the method includes applying incident light to the tissue section embedded in the solid material through the transparent substrate; the incident light passing through each of the transparent substrate, the tissue section embedded in the solid material, and the layered structure such that or more artifacts from reflecting the incident light from the tissue section embedded in the solid material is reduced.

According to another aspect, a device for visualizing a sample is provided. The device includes a tissue section embedded in a solid material having a first surface and a second surface mounted on a transparent substrate. A layered structure is disposed on the first surface of the tissue section embedded in the solid material. The layered structure is configured to reduce optical back reflections at an interface between the tissue section embedded in the solid material and the layered structure when incident light is applied to the tissue section embedded in the solid material through the transparent substrate such that one or more artifacts from reflecting the incident light from the tissue section embedded in the solid material and from the transparent substrate is reduced.

BRIEF DESCRIPTION OF THE DRAWINGS

The present disclosure will now be described more fully hereinafter with reference to the accompanying drawings, in which preferred embodiments of the disclosure are shown. This disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. Like numbers refer to like elements throughout. Other objects, features and advantages of the present disclosure will become apparent from the detailed description of the disclosure, which follows when considered in light of the accompanying drawings in which:

FIG. 1 presents a diagram of artifacts resulting from light reflection and scattering at surfaces, in accordance with some embodiments.

FIG. 2 presents a diagram of an exemplary device for visualizing a sample having a tissue section embedded in a solid material, in accordance with some embodiments.

DETAILED DESCRIPTION

Figure 3:
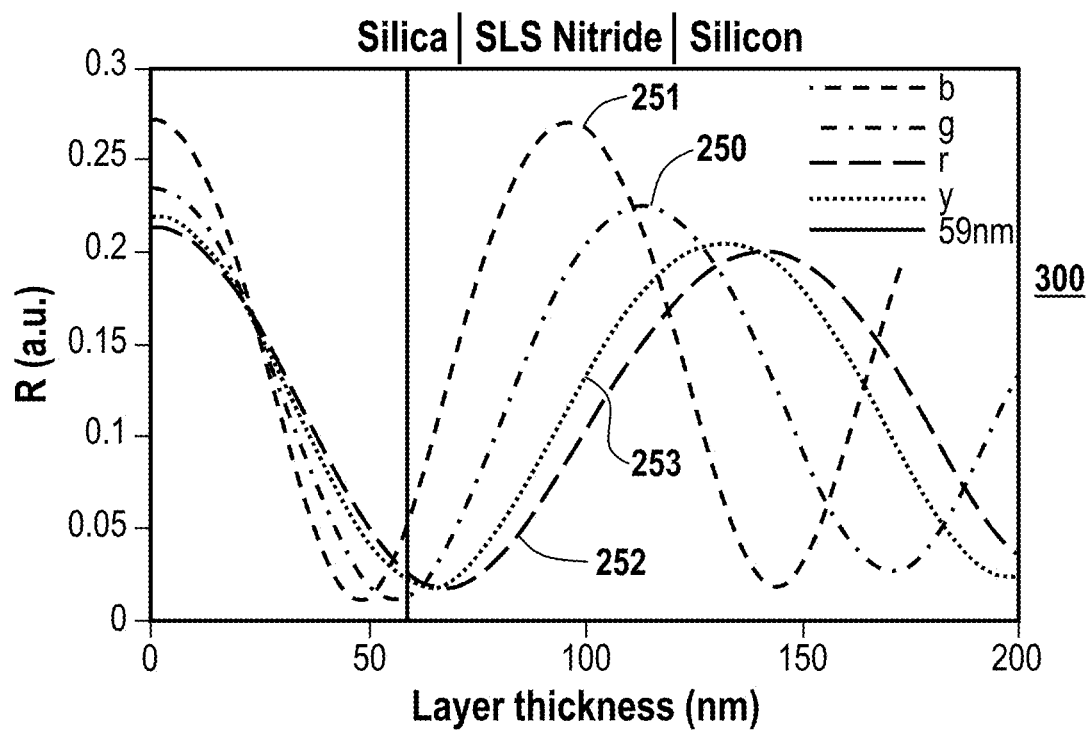
FIG. 3 presents a chart of light wavelengths when applied to a silica, SLS nitride, and silicon absorbing layered structure, in accordance with some embodiments.

Aspects of the present disclosure include methods and devices involving imaging of paraffin-embedded histopathology slides (sections) without removal of paraffin. This quality control step allows for selection of sections and regions of interest (ROI) for further processing, permitting imaging to be done without deparaffinization. Additionally, the present disclosure allows for the performance of a new modality of imaging by substituting for removal of paraffin and staining.

When imaging a histopathology (tissue) section embedded in a solid material, such as paraffin, light reflection and strong scattering from paraffin surface obscures high-quality imaging of tissue section. Furthermore, stray/unwanted light from underlying cover slide surfaces introduce stationary background which causes excess noise, or artifacts, in images.

According to the exemplary embodiments described herein in detail, the present disclosure eliminates the background noise originating from surfaces of the paraffin support as well as the cover slide interfaces. In some exemplary embodiments, the reduction/elimination of scattered and reflected light is achieved by index matching the paraffin and thus it can be used in bright-field microscopy in reflection mode. In some exemplary embodiments, an index matching medium may be used in conjunction with the paraffin support. In this case, the reduction/elimination of scattered and reflected light may be achieved by index matching the paraffin and index matching medium. In some exemplary embodiments, an index matching medium is not used. Multi-color images can be acquired where surface reflectivity of each color may be different providing an additional background rejection mechanism.

It should be noted that the instant disclosure involves deliberate preparation of high-quality sections for histopathology. High quality, sharp blades are to be used for cutting, and the knife tilt angle should be optimized for each microtome and blade type. Sample blocks should be trimmed carefully to expose tissue, and should be chilled when cut. Tissue sections should be cut slowly in a uniform, slow rotation from each block, and slides should be kept clean and distinct to avoid contamination with squamous cells prior to flotation. In this way, it is envisioned that the water surface is always skimmed between specimens to avoid contamination of one section with cells from another, and care should be taken not to brush hair or hands while floating-out sections, as squames can contaminate sections. It is important that one does not float sections from more than one block simultaneously on the water bath. Further, the water temperature of the flotation bath should be carefully monitored, with a temperature 4-5° C. below the melting point of the wax being optimal as sections readily flatten but the wax should not melt. By maintaining this temperature, wrinkles in sections should be avoided, and over-expanding of sections should be avoided by ensuring that sections are left on the flotation bath for just long enough to flatten before being promptly picked up on a slide.

According to the exemplary embodiments described herein in detail, preparing slides under the purview of the present disclosure includes taking care to avoid damaging floating sections when mechanically removing wrinkles with a brush or forceps. When choosing sections for examination, the first one or two sections in a ribbon are not selected. Additionally, bubbles in the flotation bath should be avoided before the sections are laid on the water. "Sticky", or charged, slides or section adhesives should be considered and used appropriately when placing sections, and sections should be drained briefly before being placed in the slide dryer or onto a hotplate. It is envisioned that the temperature of the slide dryer is carefully monitored, allowing the section to dry for the appropriate amount of time once removed from the flotation bath to allow for optimized preservation and subsequent examination of the section.

The instant disclosure includes methods and devices involving a quality control step for selection of sections and regions of interest (ROI) for further processing without deparaffinization. However, unstained imaging of histopathology sections has several requirements. The device must be capable of emulating common existing method must be capable of producing comparable visualizations of cellular structures with appropriate resolution and chromophore-specific contrast. Further, the device must be capable of reflection mode imaging. It is typically challenging for transmission mode microscope to visualize morphology on thick specimens such as freshly resected tissue or directly within the resection site.

According to the exemplary embodiments described herein in detail, the device must be capable of label free visualization of intrinsic endogenous contrast, as exogenous dyes can be toxic and may require additional measures in clinical and surgical environments. The microscope should not require contact with the target in order to reduce the risk of infection and permit a rapid disinfection process between cases. Further, the device must be capable of real-time feedback, as it is envisioned that this manner of imaging would provide immediate feedback during surgeries and confirm suitability of tissue acquired in biopsy procedures. Additionally, the device should be capable of 3-dimensional imaging or optical sectioning. In this way, it is envisioned that optical sectioning provides a means to visualize multiple layers of diseased tissue without the need for physical sectioning. Finally, it would be desirable if the microscope were able to image specimens at each intermediate step during the standard histopathological process.

FIG. 1 provides an overview 100 of traditional imaging paraffin-embedded Histopathology sections 110 on a conventional microscope slide 112, resulting in the problematic development that when light is applied, light reflection and scattering from the paraffin surface obscures high-quality imaging of the tissue section in the solid material 110. Stray light from the surface of the underlying slide introduces background contrast, resulting in the appearance of artifacts from the reflection against the base and subsequent scattering at each surface. As a result, images of the details of the tissue are obscured at 114.

Figure 6:
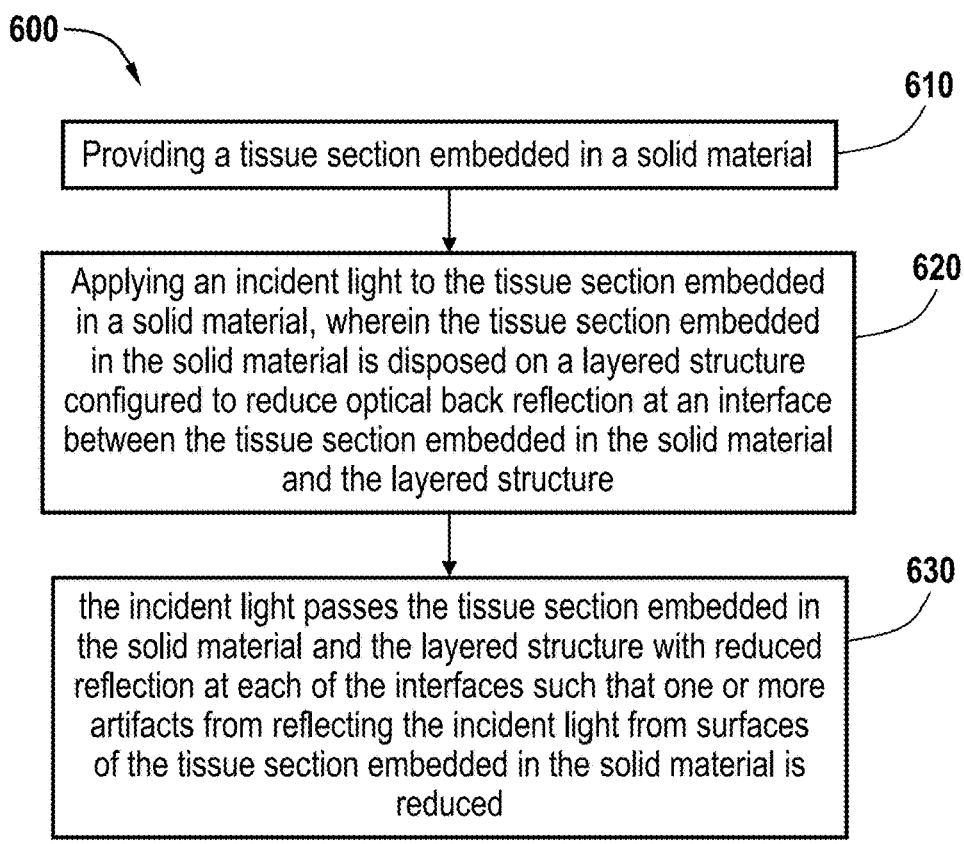
FIG. 6 presents a block diagram of the method of light reflection and scattering at surfaces eliminated by index matching, in accordance with some embodiments.

The present disclosure provides methods and devices involving a matched platform for high-quality imaging of tissue section embedded in the solid material which overcome this problem. FIG. 2 introduces an exemplary device 200 for visualizing a sample having a tissue section embedded in the solid material 210. The tissue section embedded in the solid materials is positioned on a layered structure 212, which is comprised of top surface 222 and bottom surface 226. In some exemplary embodiments, top surface 222 is comprised of one or more matching dielectric layers. In some exemplary embodiments, bottom surface 226 is a layered absorbing substrate comprised of silicon. It is envisioned that when applying an incident light 214 to a tissue section embedded in the solid material 210, the tissue section embedded in the solid material 210 is placed on a layered structure 212 adapted to reduce optical back reflection at an interface between the tissue section embedded in the solid material 210 and the layered structure 212, and covered by an index matching medium 218 and a top window 220. It is envisioned that as a result of the incident light 214 passing through each of the top window 220, the index matching medium 218, the tissue section embedded in the solid material 210, and the layered structure 212 with reduced reflection at each of the interfaces, visualizing one or more artifacts from reflecting the incident light 214 from surfaces of the tissue section embedded in the solid material 210 and from the top window 220 is reduced. In some exemplary embodiments, the index matching medium 218 is not required. This approach is additionally depicted in method 600 of FIG. 6 by way of steps 610, 620, and 630.

Continuing with the illustrative example, a surface 230 of the top window 220 is coated with an anti-reflective coating 224, which can reflect a minimal amount of background light. In some exemplary embodiments, the tissue section embedded in the solid material 210 comprises paraffin. In another aspect of the present disclosure, the tissue section embedded in the solid material 210 comprises a dielectric material 222. According to FIG. 2, the tissue section embedded in the solid material 210 is optimized to reduce optical reflection at a selected illumination wavelength for a paraffin layer without any tissue embedded. This is due to the layered structure 212 being strongly absorbing by way of bottom surface 226. The reduction of the reflection from a bottom surface 226 of the layered structure 212 is achieved by index matching the tissue section embedded in the solid material 210 and index matching medium 218, and the reduction of the reflection from a top surface 222 of the layered structure 212 is achieved by index matching the tissue section embedded in the solid material 210 and index matching medium 218.

When index matching medium 218 is not used, the reduction of the reflection from bottom surface 226 of layered structure 212 is achieved by substantially index matching the tissue section embedded in the solid material 210 and top window 220, and the reduction of the reflection from a top surface 222 of the layered structure 212 is achieved by substantially index matching the tissue section embedded in the solid material 210 and top window 220.

In this way, when light is applied to the bottom surface 226 of layered structure 212, it is envisioned that only the signal from the sample object, such as the tissue section embedded in the solid material 210, is perceived, rather than the background signal. Thereby, this process matches the surfaces to reduce contrast by utilizing, for example, an absorbing silicon substrate as bottom surface 226 and one or more dielectric layers as top surface 222 to eliminate reflection from bottom surface 226 in relation to the tissue embedded in the solid material 210. In this illustrative example, the index matching medium 218 prevents matching of respective surfaces, further reducing or eliminating glare and/or reflections. Note in other exemplary embodiments index matching medium 218 is not required and layered structure 212 reduces or eliminates glare and/or reflections. The glare from the top window 220 can be further reduced or eliminated by the anti-reflective coating 224 as well. Additionally, it should be noted that as the cutting process is done with a blade, roughness of the sample is proportional to the wavelength of light.

In some embodiments, the index matching medium 218 includes an index matching liquid or immersion fluid. In some embodiments, the index matching medium is the solid material used for index matching.

Figure 4:
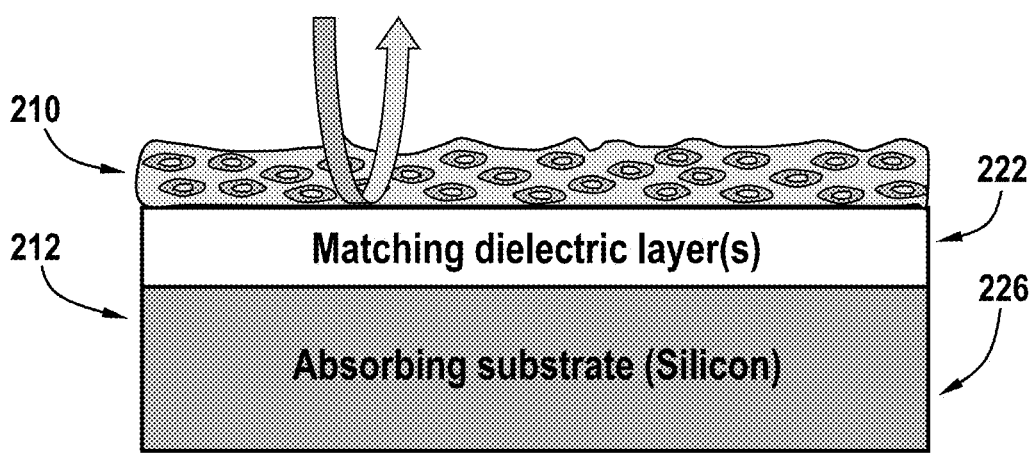
FIG. 4 presents a diagram corresponding with FIG. 3, depicting minimization of light reflection from the bottom surface of a section, in accordance with some embodiments.

Further, as previously introduced by the illustrative example, it is envisioned that the top surface 222 may include index matching coating materials having silicon or the like, and in some embodiments, the top surface 222 of the layered structure 212 includes a silicon-nitride coating, as illustrated in FIG. 4.

Figure 5:
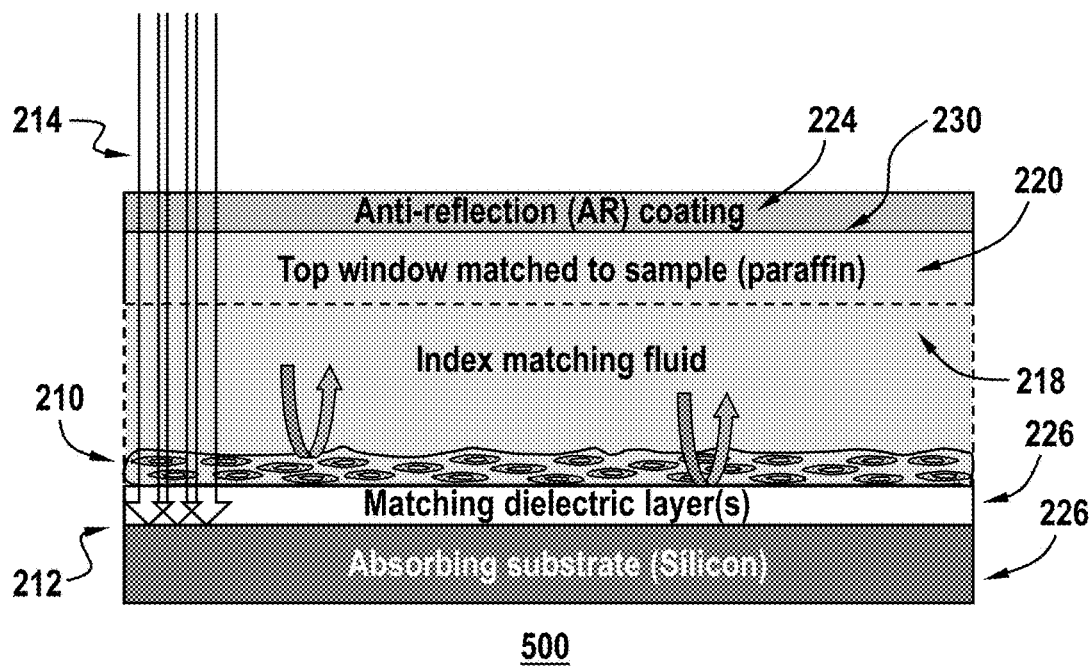
FIG. 5 presents a diagram corresponding with FIG. 3, depicting when light is applied different wavelengths, in accordance with some embodiments.

FIG. 3 includes a graph 300 of the reflectivity of a layered structure having silica, SLS nitride, and a silicon absorbing layered structure (where silica has optical properties similar to paraffin). This layered structure provides less than 1% reflectivity at a selected illumination wavelength, as shown in FIG. 3. Moreover, green illumination (plot 250) has a lower reflectance than blue illumination (plot 251), but a higher reflectance than red illuminations (plot 252) and yellow illumination (plot 253) for the layered structure. If there is no tissue structure to scatter light, purple would be indicated. Notably, the selected illumination wavelength enables observation of one or more features of the tissue section embedded in the solid material 210 and surface reflections separately when one or more incident light 214 is applied, as depicted in method 500 of FIG. 5. In this case, a false color image may be acquired by sequential imaging under different RGB illuminations.

Notably, this illustrative example of the present disclosure allows for an operator to perform a quality control operation of the tissue section embedded in the solid material 210. It is envisioned that these features can permit an operator to decide which tissue sections 210 should be further processed (for example, undergo deparaffinization, staining, etc.) and which tissue sections 210 should be discarded or otherwise determined as improper candidates to move forward and subject to additional operations. Additionally, the present disclosure envisions that an operator may record an image of the tissue section 210 for tracking follow-on preparation steps, to calibrate the sectioning instrument, or other related operations.

Continuing with the illustrative example, once an operator has completed a quality control review and determined that a tissue section 210 may be a candidate for further processing, the present disclosure allows for the performance of a new modality of imaging by substituting for removal of paraffin and staining. In this way, the system and method of the present disclosure allows for clear images while the tissue is still embedded in the solid material, such as paraffin, by providing and subsequently combining multi-color or multi-angle images to identify tissue features. The layered structure 212 reflects differently at different wavelengths to provide multi-color imaging. In this way, the multi-color imaging provides an additional background rejection mechanism. According to the present disclosure, the multi-color imaging can also permit the identification of artifacts in the tissue section embedded in the solid material 210, or can provide inputs for machine learning and artificial intelligence methods for artificial staining of the image of the tissue section embedded in the solid material 210.

The machine learning and artificial intelligence methods may include a deep-learning algorithm to perform artificial staining, which can digitally transform RGB images on unstained tissue sections embedded in paraffin to staining images. The machine learning and artificial intelligence methods may include an unsupervised deep learning algorithm allowing artificial staining using unpaired input and output image sets. This framework acquires the training data set straightforwardly. To collect this training set, one may collect images using the prototype platform on unstained tissue sections of the same type. Next, one may collect another set of images on different stained tissue sections of the same type. Alternatively, the physical acquisition of the stained dataset may be replaced by a publicly available dataset of the same tissue type. Next, the machine learning and artificial intelligence methods may be trained using this dataset to perform artificial staining.

Figure 7:
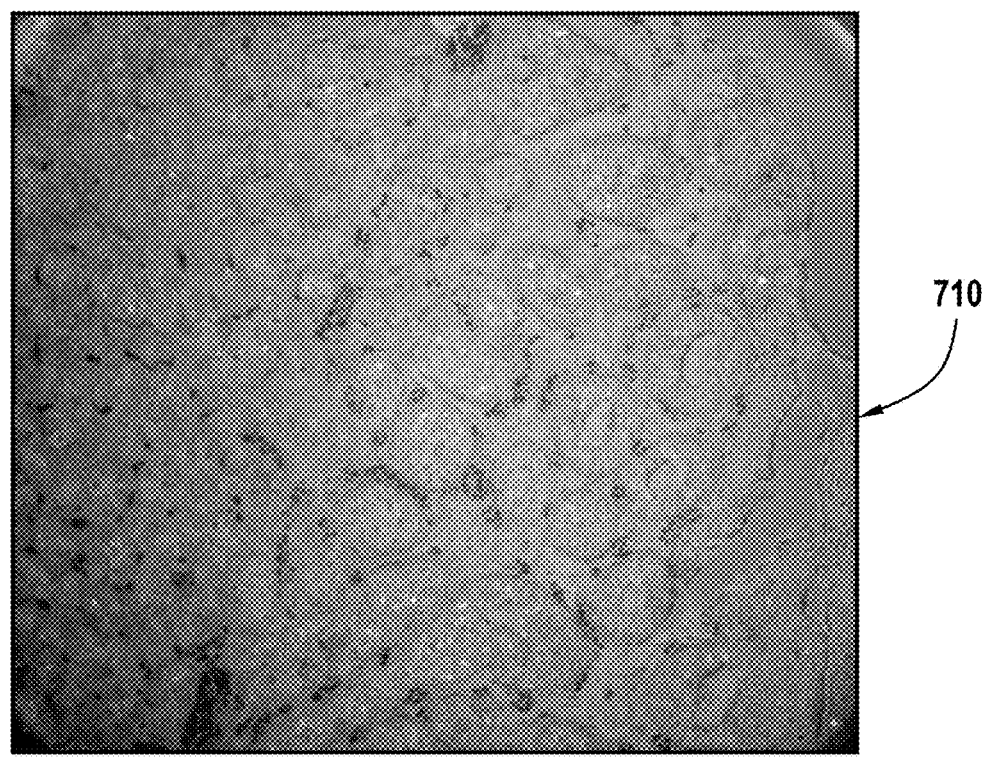
FIG. 7 presents an image of sample composition of combined RGB images, in accordance with some embodiments.

According to the exemplary embodiments described herein in detail, it is envisioned that the selected illumination wavelength enables observation of one or more embedded features and a surface reflection separately, as seen in tissue section embedded in the solid material 710 of FIG. 7. This provides a single-color image of the same image. For example, green reflectivity is minimal for featureless parts of the section, as compared to blue and red reflection, which is higher. In this illustrative embodiment, tissue features appear green over a purple background, as red and blue have a stronger reflection at the surface under the section.

In another aspect of the present disclosure, the process can permit either sequential imaging (RGB) or all imaging being performed simultaneously. It is worth noting that visualizing one or more artifacts can includes two or more consecutive tissue sections 210 imaged for three-dimensional reconstruction. It is envisioned that evaluating the sample is performed to determine whether the solid material, such as paraffin, should be removed from the sample for further processing, and to determine whether the sample should be stained.

In an illustrative embodiment of the present disclosure, quality control instruments, consumables and methods for selection of tissue section embedded in the solid material 210 are included in the present disclosure. It is envisioned that this line of products and services can be utilized to pre-select the sections prior to laborious and expensive processing related to solid material, such as paraffin, removal and staining. In an additional illustrative embodiment of the present disclosure, it is envisioned that unstained tissue imaging and virtual staining can be evaluated by, for example, artificial intelligence, which can further eliminate the need for removing the paraffin and dramatically simplify the process while also significantly reducing cost and time.

In some embodiments, near real-time pathological evaluation would be possible, such as during surgery.

In another aspect of the present disclosure, the layered structure 212 can reflect differently at different illumination angles to provide multi-modal imaging by varying the illumination angle. In some illustrative embodiments, multi-modal imaging is achieved by apodizing the illumination beam 214. In some illustrative embodiments, multi-modal imaging achieved by varying the illumination angle provides an additional background rejection mechanism. In some illustrative embodiments, multi-modal imaging achieved by varying the illumination angle provides identification of artifacts in the tissue section embedded in the solid material 210. In some illustrative embodiments, multi-modal imaging by varying the illumination angle provides for machine learning and artificial intelligence methods for artificial staining the image of the tissue section embedded in the solid material 210.

Figure 8:
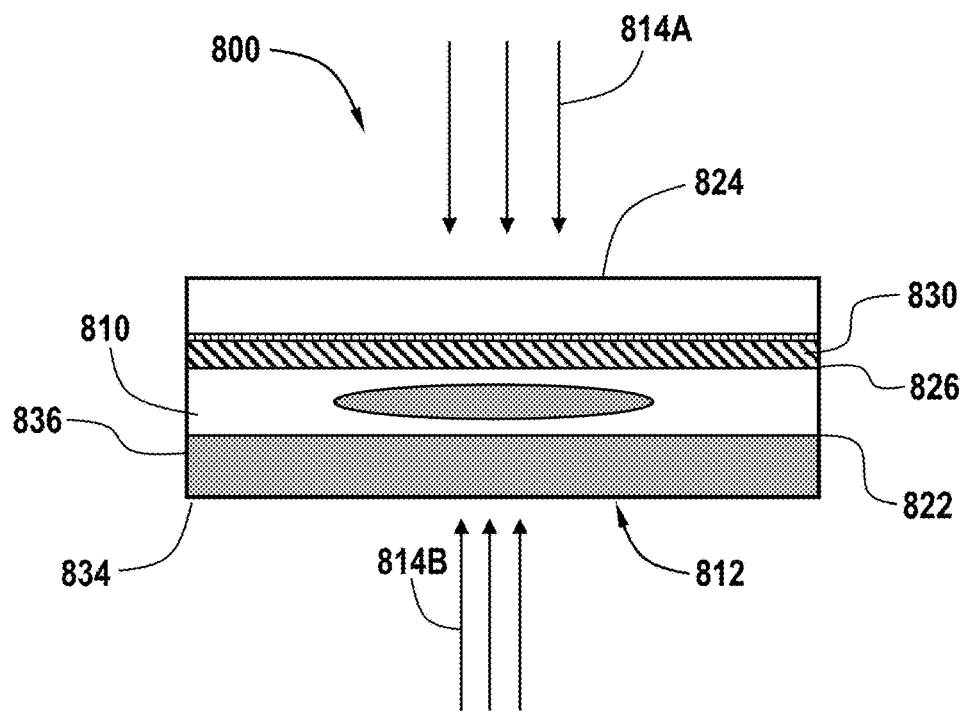
FIG. 8 presents a diagram of another exemplary device for visualizing a sample having a tissue section embedded in a solid material, in accordance with some embodiments.

According to the exemplary embodiments described herein in detail, the present disclosure also includes a device 800 for visualizing a sample. As shown in FIG. 8, a tissue section embedded in the solid material is positioned on a layered structure 812. The tissue section embedded in the solid material 810 has a first surface 822 and a second surface 826. A transparent substrate 824 is mounted on second surface 826. The second surface 826 may be mounted on the tissue section embedded in the solid material 810 using an optionally included adhesive layer 830. The layered structure 812 is disposed on first surface 822 of the tissue section embedded in the solid material 810. Incident light 814A or 814B are used to illuminate the top or bottom of device 800. In some exemplary embodiments, incident light 814A and 814B are used to illuminate both the top and bottom of device 800.

The layered structure 812 is configured to reduce optical back reflection at an interface between tissue section embedded in the solid material 810 and layered structure 812. The layered structure 812 is similar to layered structure 212. Incident light 814A or 814B is applied to the tissue section embedded in the solid material 810 through transparent substrate 824.

In some exemplary embodiments, illumination is provided from the top of device 800 via incident light 814A that passes from top region of device 800 through each of the transparent substrate 824, tissue section embedded in the solid material 810, and layered structure 812. This way, visualizing one or more artifacts from reflecting the incident light 814 from surfaces 822 and 826 of the tissue section embedded in the solid material 810 and from the transparent substrate is reduced. The reduction of the reflection from a first surface 834 of layered structure 812 is achieved by index matching the tissue section embedded in the solid material 810 and transparent substrate 824, and the reduction of the reflection from a second surface 836 of layered structure 812 is achieved by index matching the tissue section embedded in the solid material 210 and transparent substrate 824. The device 800 performs similarly to device 200 including performing operations described in FIGS. 3-7.

In some exemplary embodiments, illumination is provided from the bottom of device 800 via incident light 814B that is applied to layered structure 812 for imaging the tissue section embedded in the solid material 810. In this way, when light is applied to first surface 834 of layered structure 812, it is envisioned that only the signal from the sample object, such as the tissue section embedded in the solid material 810, is perceived, rather than the background signal. Thereby, this process matches the surfaces to reduce contrast by utilizing, for example, an absorbing silicon substrate as first surface 834 of layered structure 812 and one or more dielectric layers as second surface 836 of layered structure 812 to eliminate reflection from first surface 834 in relation to the tissue embedded in the solid material 810. In some exemplary embodiments, device 800 receives illumination from both incident light 814A and 814B simultaneously for imaging the tissue section embedded in the solid material 810.

Figure 9:
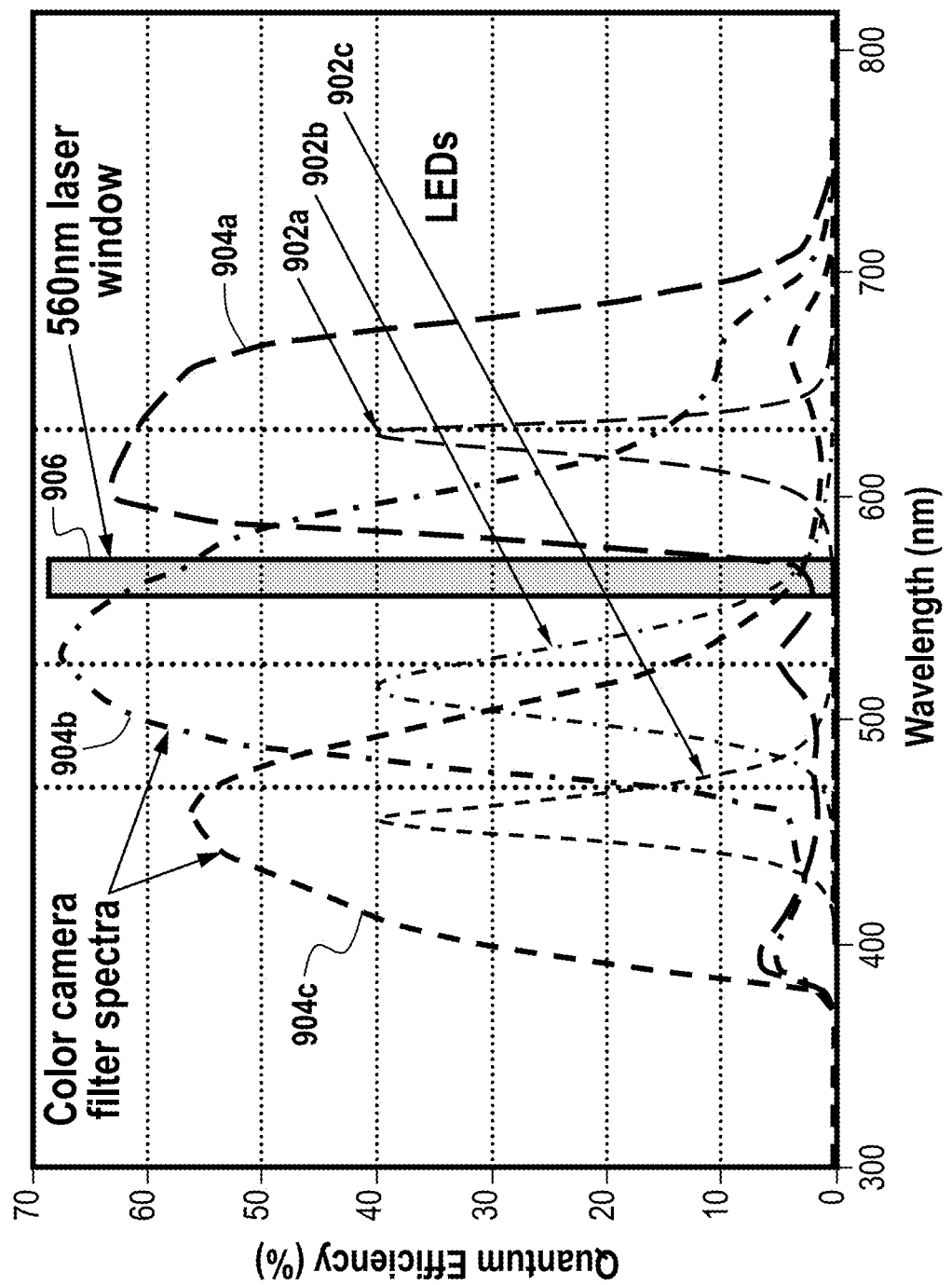
FIG. 9 presents a diagram of a standard RGB LED spectra from an imaging system superimposed on color camera filters.

According to the exemplary embodiments described in detail, the present disclosure may include an imaging instrument utilizing a light source with unprecedented color and intensity uniformity. FIG. 9 shows standard RGB LED spectra, defined by red illumination 902a, green illumination 902b, and blue illumination 902c, superimposed on color camera filters, with a red illumination response 904a, green illumination response 904b, and blue illumination response 904c, illustrating an available window 906 for 560 nm laser illumination for autofluorescence. One may optimize the selection of LED colors to match the filter response of color camera pixels to minimize reflection at the paraffin surface for one color (e.g., green). As illustrated in FIG. 2, window 206 may allow for an RGB imaging design with a laser line filter without interfering with light microscopy. Since LED sources at long-green wavelengths (lime) are notoriously inefficient and broad spectrum, it is essential to combine with a laser source benefiting from the speckle-free uniformity provided by the imaging instrument. One may achieve <1% uniformity in illumination. The imaging instrument may have ~1% reflectivity at one of the three illumination LEDs. A color camera may achieve high-contrast color images by simultaneously illuminating with the RGB LEDs. One may have speckle-free laser illumination with 1% uniformity. Moreover, the imaging instrument may use autofluorescence imaging of a layered structure to reduce imaging artifacts due to reflections at one or more interfaces between the tissue section embedded in the solid material and adjacent surfaces of the layered structure.

Although various aspects of the present disclosure are described herein in terms of various exemplary embodiments, it should be understood that variations and modifications may be made to the disclosure described herein to adopt it to various usages and conditions within the scope of applicant's invention as claimed herein.

The recitation of a listing of elements in any definition of a variable herein includes definitions of that variable as any single element or combination (or sub-combination) of listed elements. The recitation of an embodiment herein includes that embodiment as any single embodiment or in combination with any other embodiments or portions thereof.

All patents and publications mentioned in this specification are herein incorporated by reference to the same extent as if each independent patent and publication was specifically and individually indicated to be incorporated by reference.

The invention claimed is:

1. A method for visualizing a sample comprising:
providing a tissue section embedded in a solid material;
applying an incident light to the tissue section embedded in the solid material, wherein the tissue section embedded in the solid material is disposed in a layered structure configured to reduce optical back reflection at one or more interfaces between the tissue section embedded in the solid material and adjacent surfaces of the layered structure;

reflecting, using the layered structure, light differently at different illumination angles to image the tissue section embedded in the solid material,
wherein the layered structure comprises a first surface having a plurality of dielectric layers and a second surface having a semiconducting substrate; and
wherein the incident light passes through the tissue section embedded in the solid material and the layered structure with reduced reflection at each of the interfaces such that one or more artifacts from reflecting the incident light from surfaces of the tissue section embedded in the solid material are reduced.

2. The method of claim 1, wherein the solid material comprises paraffin.

3. The method of claim 2, wherein the reduction of the reflection from one or more surfaces between the tissue section embedded in the solid material and other components of the layered structure is achieved by index matching paraffin using an index matching medium.

4. The method of claim 1, further comprising providing an index matching medium disposed on the tissue section embedded in the solid material.

5. The method of claim 1, wherein the layered structure includes an optically transparent layer through which the tissue section embedded in the solid material can be imaged.

6. The method of claim 5, wherein the optically transparent layer includes an anti-reflective coating.

7. The method of claim 1, wherein the layered structure includes a light absorbing layer.

8. The method of claim 7, wherein the layered structure includes a silicon-nitride coating on silicon to reduce the reflectivity at the interface with the solid material at one or more selected illumination wavelengths.

9. The method of claim 1, further comprising autofluorescence imaging using the layered structure to reduce imaging artifacts due to reflections at one or more interfaces between the tissue section embedded in the solid material and adjacent surfaces of the layered structure.

10. The method of claim 1, further comprising reflecting, using the layered structure, light differently at different wavelengths to provide multi-color imaging.

11. The method of claim 10, further comprising providing, using the multi-color imaging, inputs for machine learning and artificial intelligence methods for artificial staining of the image of the tissue section embedded in the solid material.

12. The method of claim 1, wherein reflecting the light differently comprises reflecting the light at different illumination angles to provide multi-modal imaging by varying the illumination angle.

13. The method of claim 12, wherein the multi-modal imaging is achieved by varying the illumination angle to provide for machine learning and artificial intelligence methods for artificial staining an image of the tissue section embedded in the solid material.

14. The method of claim 1, wherein visualizing the one or more artifacts includes two or more consecutive tissue sections imaged for three-dimensional reconstruction.

15. The method of claim 1, further comprising determining whether the tissue section embedded in the solid material should be selected for or eliminated from further processing or staining.

16. A device for visualizing a sample, the device comprising:
a layered structure beneath a tissue section embedded in a solid material, wherein the layered structure is configured to reduce optical back reflections at one or more interfaces between the tissue section embedded in the solid material and adjacent surfaces of the layered structure when an incident light is applied to the tissue section embedded in the solid material,
wherein the layered structure comprises a first surface having a plurality of dielectric layers and a second surface having a semiconducting substrate;
wherein the layered structure reflects light differently at different illumination angles to image the tissue section embedded in the solid material; and
wherein the incident light passes through the tissue section embedded in the solid material and the layered structure with reduced reflection at each of the interfaces such that one or more artifacts from reflecting the incident light from surfaces of the tissue section embedded in the solid material are reduced.

17. The device of claim 16, wherein the solid material comprises paraffin.

18. The device of claim 16, wherein the layered structure includes an optically transparent layer through which the tissue section embedded in the solid material can be imaged.

19. The device of claim 16, wherein the optically transparent layer has an anti-reflective coating.

20. The device of claim 16, wherein the layered structure includes a light absorbing layer.

21. The device of claim 20, layered structure includes a silicon-nitride coating on silicon, optimized to reduce the reflectivity at the interface with the solid material at one or more selected illumination wavelengths.

22. A method for visualizing a sample, the method comprising:
providing a tissue section embedded in a solid material having a first surface and a second surface mounted on a transparent substrate;
positioning a layered structure on the first surface of the tissue section embedded in the solid material, the layered structure configured to have reduced reflection at the first surface of the tissue section embedded in the solid material, wherein the layered structure comprises a plurality of dielectric layers and a semiconducting substrate; and
applying incident light to the tissue section embedded in the solid material through the transparent substrate; the incident light passing through each of the transparent substrate, the tissue section embedded in the solid material, and the layered structure such that one or more artifacts from reflecting the incident light from the tissue section embedded in the solid material are reduced, wherein the layered structure reflects light differently at different illumination angles to image the tissue section embedded in the solid material.

23. The method of claim 22, wherein the solid material comprises paraffin.

24. The method of claim 22, wherein the layered structure comprises a silicon substrate.

25. The method of claim 22, further comprising mounting the tissue section embedded in the solid material on the transparent substrate by using an adhesive.

26. The method of claim 22, wherein the layered structure is contacted to the first surface of the tissue section embedded in the solid material, and further comprising index matching the tissue section embedded in the solid material and the transparent substrate to reduce reflection at the first surface of the tissue section embedded in the solid material.

27. The method of claim 22, wherein the layered structure comprises an absorbing layered structure.

28. The method of claim 27, wherein the layered structure includes a silicon- nitride coating on silicon, optimized to reduce the reflectivity at the interface with the solid material at one or more selected illumination wavelengths.

29. A device for visualizing a sample comprising:
   a tissue section embedded in a solid material having a first surface and a second surface mounted on a transparent substrate; and
   a layered structure disposed on the first surface of the tissue section embedded in the solid material, wherein the layered structure is configured to reduce optical back reflections at an interface between the tissue section embedded in the solid material and the layered structure when incident light is applied to the tissue section embedded in the solid material through the transparent substrate such that one or more artifacts from reflecting the incident light from the tissue section embedded in the solid material and from the transparent substrate are reduced, wherein the layered structure comprises a plurality of dielectric layers and a semi-conducting substrate, and wherein the layered structure reflects light differently at different wavelengths to image the tissue section embedded in the solid material.

30. The device of claim 29, wherein the solid material comprises paraffin.

* * * * *